Aug. 27, 1946.   A. P. DAVIS ET AL   2,406,323
REMOTE CONTROL APPARATUS
Filed May 6, 1937   4 Sheets-Sheet 1

INVENTORS
Arthur P. Davis
BY George Agins
Husquet, Moary & Campbell
ATTORNEYS

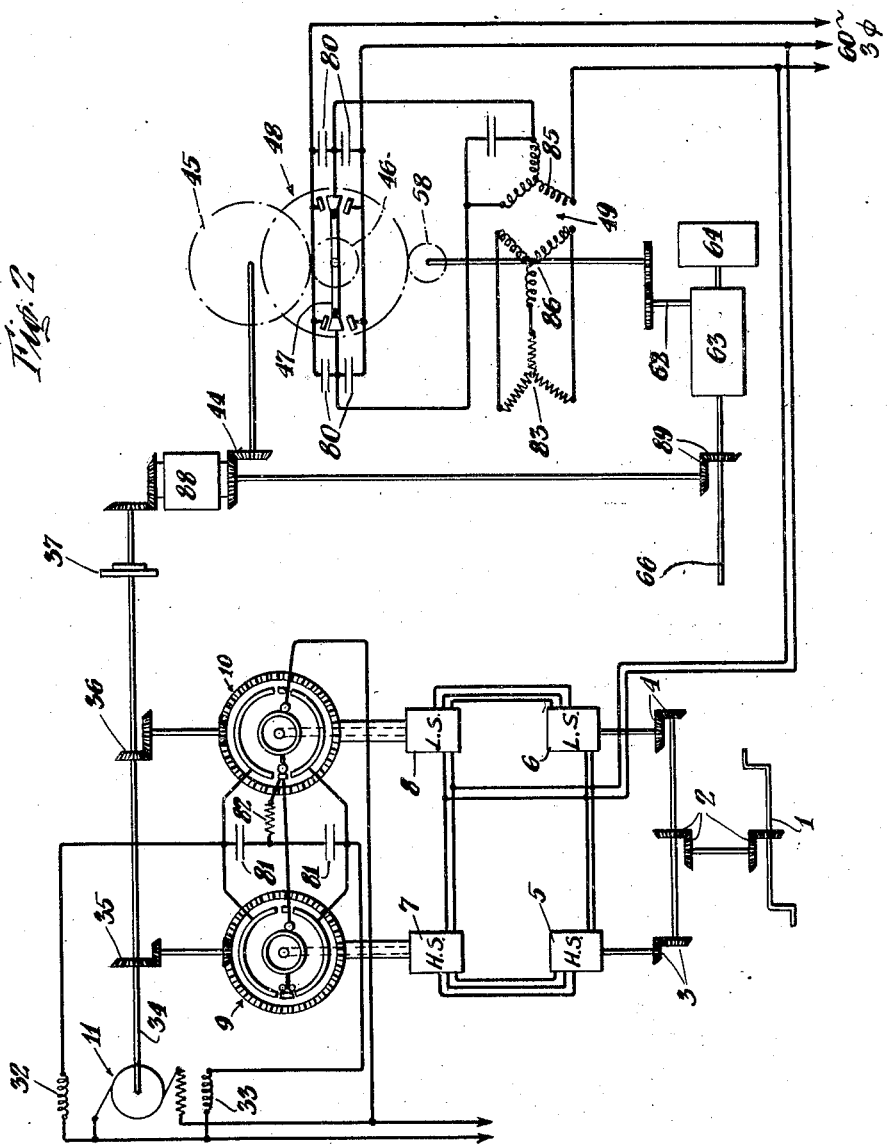

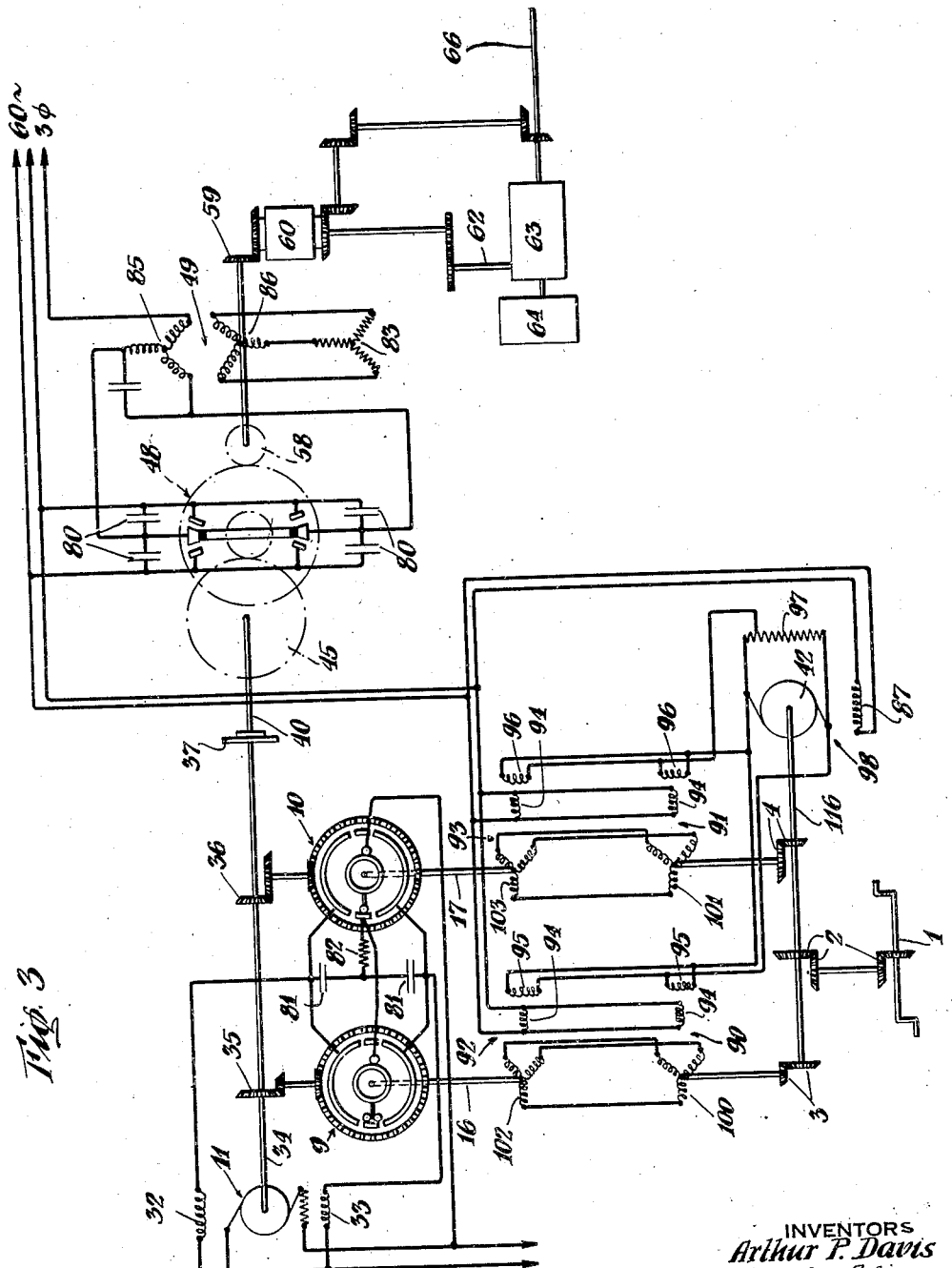

Aug. 27, 1946.    A. P. DAVIS ET AL    2,406,323
REMOTE CONTROL APPARATUS
Filed May 6, 1937    4 Sheets-Sheet 4
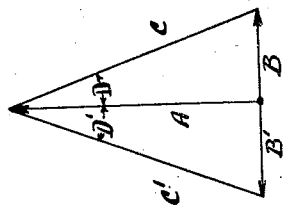
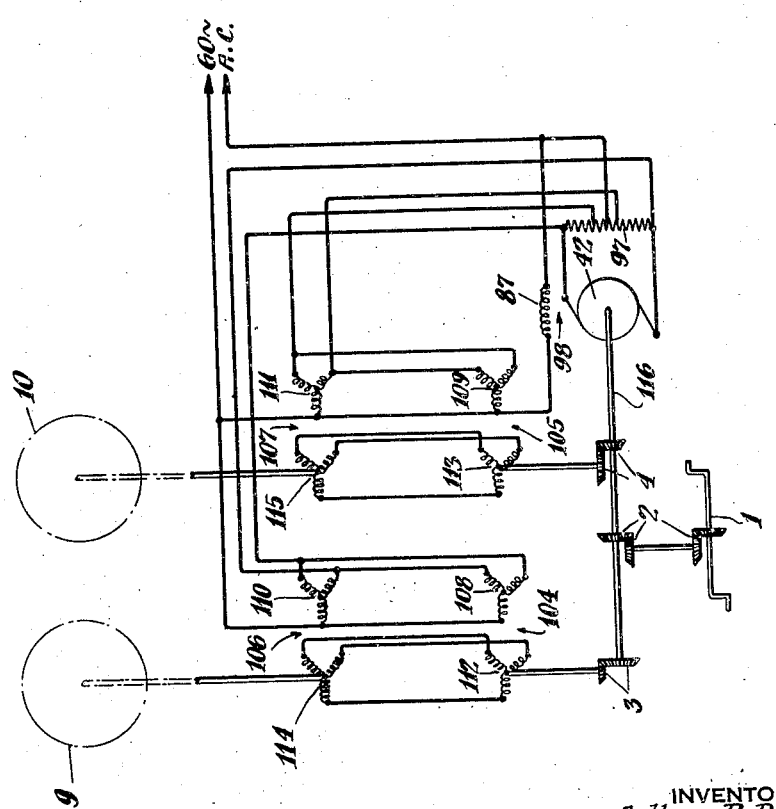
INVENTORS
Arthur P. Davis
George Agins
BY
August, Neary & Campbell
ATTORNEYS Patented Aug. 27, 1946

2,406,323

UNITED STATES PATENT OFFICE 2,406,323

REMOTE CONTROL APPARATUS

Arthur P. Davis, New York, and George Agins, Brooklyn, N. Y., assignors to Arma Corporation, a corporation of New York Application May 6, 1937, Serial No. 141,189

11 Claims. (Cl. 172—239)

1

This invention relates to control systems and has particular reference to follow-up control systems in which a local or remote controlled element may be instantaneously driven at a rate of speed and through a distance or angle corresponding to the rate and extent of movement of a controlling element.

The follow-up systems in general use, especially those adapted for heavy duty work, are complicated and expensive and where a relatively high degree of accuracy is required, the sensitivity necessary to gain such accuracy is accompanied by objectionable hunting of the controlled element. Such systems usually employ sensitive but delicate electronic valve arrangements which are likely to get out of order. All of the advantages of electronic follow-up control systems are realized in the system of the present invention while eliminating their disadvantages, to the end that a rugged, non-hunting system is provided, which is readily adaptable to various uses where it is desired to accurately and rapidly position one or more light or heavy controlled elements in accordance with the movements of a local or remote controlling element.

The control system of the present invention includes a reversing switching mechanism, one member of which is driven by a relatively low torque pilot motor controlled by the controlling element, and the other member of which is operatively connected to a control motor whose acceleration should preferably be greater than that of the pilot motor, and which is controlled by the reversing switching mechanism. The control motor also controls a variable speed hydraulic gear which drives the controlled element. The controlled element accordingly instantaneously responds to all movements of the controlling element, and for any sudden slowing, stopping, or reversing of the controlling element, the reversing action of the switching mechanism reverses the phase sequence of the power to the control motor, which results in braking it to the desired speed or zero speed. Means are provided to compensate for any irregularities in the system, and to compensate for the velocity lag of the variable speed hydraulic gear.

It will be seen that in the control system of the present invention, the speed and acceleration of the control motor are governed entirely by the frequency of the intermittent contact action of the reversing switching mechanism, and by the ratio of the time during which the contacts are engaged compared to the time during which the contacts are broken.

2

For a more complete understanding of the invention, reference may be had to the accompanying drawings, in which:

Fig. 2 is a schematic diagram of the control system with modifications;

Fig. 3 is a schematic diagram of the system with modifications in the means of compensating for the velocity lag of the variable speed hydraulic gear;

Fig. 4 is a schematic diagram of another modified compensating means; and

Fig. 5 is a vector diagram, illustrating the magnetic field shift of the compensating means for the lag in the variable speed hydraulic gear.

Figure 1:
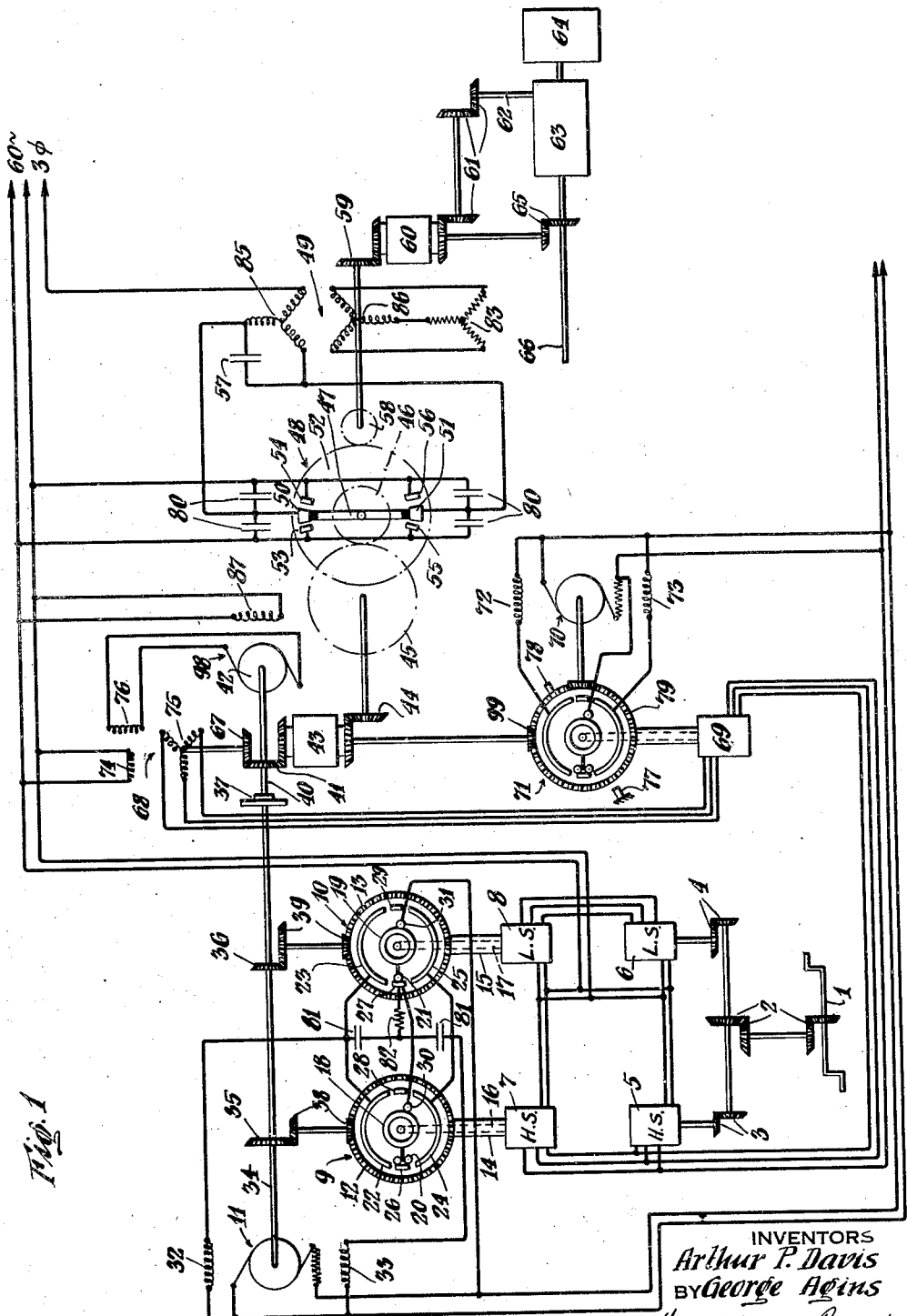
Figure 1 is a schematic diagram of the control system of this invention as adapted to alternating current service.

Referring to Fig. 1 of the drawings, the controlling element, located at a local or remote station, may be a handwheel 1, or other controlling device, which, through gearing 2, 3, and 4, actuates the rotors of respective high and low speed self-synchronous rotary induction transmitters 5 and 6. Located at the local or remote station of the controlled element, which may be a shaft 66 driving any heavy or light object, are respective high and low speed self-synchronous rotary induction receivers 7 and 8, which are electrically connected respectively to the corresponding high and low speed transmitters 5 and 6, so that the rotors of the receivers are in positional agreement with the rotors of the corresponding transmitters at all times. The transmitters and receivers are preferably of the single phase field type, and the two receivers 7 and 8 are equipped with follow-up heads 9 and 10, the contacts of which control a suitable pilot motor 11.

The two follow-up heads 9 and 10 include respective gears 12 and 13, which are co-axially journalled to the ends of stationary sleeves 14 and 15, mounted on the frames of the respective receivers 7 and 8. The shaft extensions 16 and 17 of their rotors are free to turn within the corresponding sleeves. The slip rings 18 and 19 and trolley arrangements 20 and 21, are fastened securely to the ends of the corresponding rotor shaft extensions 16 and 17 and are insulated from them. Two long contact segments, 22, 23, and 24, 25, and two short contact segments, 26, 27, and 28, 29, are mounted on the respective gears 12 and 13, and insulated from them and from each other. The two long segments are diametrically opposite each other, and the two short segments are diametrically opposite each other and positioned in the spaces between the ends of the corresponding long segments. Contact rollers or brushes 30 and 31 are held by light pressure against the corresponding slip rings 18 and 19 at all times. A double trolley contactor 20 on high speed follow-up head 9, and a single trolley contactor 21 on low speed follow-up head 10, are held by light pressure against the contact segments. The width of the double trolley 20 is such in relation to the length of the short segments 26 and 28 as to make the effective gap on either side of its central position very short.

The long segments of the two follow-up heads are electrically connected to the field systems of the pilot motor 11. The upper long segments 22 and 23 are both connected to one field system, 32, and the lower long segments 24 and 25 are both connected to the other field system, 33. Condensers 81 with protective resistance 82, are electrically connected across the contacts of the follow-up heads for spark suppression. The pilot motor 11 preferably is of the reversible type with two independent field systems, only one of which can be energized at a time. The electrical connections are such that when one field system is energized, the pilot motor 11 will run in one direction, and when the other field system is energized, it will run in the opposite direction.

The pilot motor shaft 34 carries gears 35 and 36 and mechanical filter 37. The mechanical filter tends to absorb irregularities in the system and may be of any well known type. Gear 35 drives gear 12 of high speed follow-up head 9, through gears 38, while gear 36 drives gear 13 of low-speed follow-up head 10 through gears 39. The gear ratios and electrical connections between pilot motor 11 and high speed and low speed follow-up heads 9 and 10 are such that when a field winding of the pilot motor 11 is energized, gear 12 is caused to turn in the same direction and through the same angle as previously made by trolley 20, while gear 13 is caused to turn in the same direction and through the same angle as previously made by trolley 21. Therefore, when gears 12 and 13 have turned through the same angles as their respective trolleys 20 and 21, the follow-up heads 9 and 10 will be in the neutral position. This will deenergize the pilot motor 11 field and thereby stop the motor.

The output side of the mechanical filter 37 is secured to shaft 40 having the gear 41, which is connected to the armature 42 of a small alternating current commutator generator 93. The field winding 87 of this generator is separately excited from a suitable alternating current source. Gear 41 drives the input of mechanical differential 43, whose output drives gear 44, which is connected to idler gear 45 driving the gear 46 carrying contact arm 47 of reversing switching mechanism 48. Damping means, not shown, but preferably of the type illustrated and described in copending application Serial No. 115,488, filed December 12, 1936, are interposed between gear 46 and contact arm 47. The reversing switching mechanism controls the power input and the direction of rotation of control motor 49. Two contacts, 50 and 51, are mounted at the extremities of contact arm 47 and are insulated from the arm and from each other. Gear 52, coaxially mounted with gear 46, is free to turn independently of the latter and carries two contacts, 53 and 54, adapted to cooperate with contact 50, and two other contacts, 55 and 56, adapted to cooperate with contact 51. These relatively fixed contacts 53 to 56 are insulated from the gear 52 and from each other.

In the disengaged position of the reversing switching mechanism 48, there is provided a smaller air gap between contacts 50 and 53, 51 and 55, than there is between contacts 50 and 54, 51 and 56, as illustrated in Fig. 1. The contacts 53 to 56 are spring mounted, preferably as shown in said application, so that when contact 50 engages contact 53, for example, and the transmitted force of gear 46 necessitates further turning of the arm 47, the spring of contact 53 will be compressed sufficiently to allow contact 51 to engage contact 55. Similarly, if gear 46 is turned in the opposite direction with the same force, contact 51 will engage contact 55, and then contact 50 will engage contact 54. This is done so that two steps of acceleration of motor 49 are obtained. The first step of acceleration of motor 49 is split phase starting effected by condenser 57, which is electrically connected across two of the terminals of motor stator 85, and the second acceleration step is full stator voltage. Condensers 80 are connected across the contacts of the reversing switching mechanism 48 for spark suppression. Further details of construction of the reversing switch mechanism are illustrated and described in said copending application.

Mounted on one end of the rotor shaft of control motor 49 is a gear 58 meshing with gear 52 of reversing switching mechanism 48. The ratio between gears 52 and 58, and the electrical connections to the motor 49, are such that the turning of the rotor tends at all times to turn gear 52 in the same direction and through the same angle as previously made by gear 46. When gear 52 has turned through the same angle as gear 46, the contacts of the reversing switching mechanism 48 will have returned to the disengaged position, thereby stopping control motor 49. Gear 59, mounted on the other end of the rotor shaft of motor 49, drives the input to mechanical differential 60, the output of which is connected through gears 61, to the control shaft 62 of a variable speed hydraulic gear 63. The hydraulic gear 63 is of the well known type in which the output speed varies directly as the control displacement and in which the direction of motion of the output shaft is determined by the direction of the displacement of the control shaft 62 from the neutral position. The power motor 64 drives the variable speed hydraulic gear and the hydraulic gear drives the controlled element 66. The other input side of the mechanical differential 60 is connected by gearing 65 to drive shaft 84, so that the turning of the controlled element 66 tends at all times to return the control shaft 62 of the hydraulic gear 63 to the neutral or zero speed position.

In operation of the control system illustrated in Fig. 1, and assuming that it is in its normal deenergized condition with the controlled element 66 in positional agreement with the controlling element 1, rotation of the controlling element 1 will be transmitted through gearing 2, 3, and 4 to the rotors of the high and low speed transmitters 5 and 6. The resultant rotation of the rotors thereof in a corresponding direction and angle will result in an equal and substantially simultaneous movement of the rotors of respective high and low speed receiver motors 7 and 8. The double trolley 20 of high speed follow-up head 9 will accordingly be displaced to engage either segment 22 or 24, depending upon the direction of rotation of the controlling element 1. This will effect energization of the appropriate field coil 32 or 33 of pilot motor 11, and cause it to rotate gears 12 and 13 in the appropriate direction, until the follow-up heads 9 and 10 are again in the inoperative position.

The rotation of the pilot motor 11 will also be transmitted by its shaft 34 through mechanical filter 37, shaft 40, and gear 41, to the input of mechanical differential 43. The output of differential 43 drives gears 44, 45 and 46 to actuate contactor 47 of the reversing switching mechanism 48. Depending on the direction of rotation of the controlling element 1, the appropriate contact on contactor 47 will engage the cooperating contact, either 53 or 55, which will give split phase starting for control motor 49. If the transmitted force of the rotation of the pilot motor 11 necessitates further turning of gear 46, the other contact on movable contactor 47 will engage cooperating contact 56 or 54, which will connect all three power phases to the control motor 49. The rotation of control motor 49, through gear 58, will turn gear 52 in the appropriate direction until the reversing switching mechanism 48 contacts are disengaged and again in the inoperative position.

The rotation of control motor 49 is also transmitted through mechanical differential 60 and gearing 61 to the control shaft 62 of variable speed hydraulic gear 63, which will cause the control mechanism thereof to be turned from the inoperative, or zero speed position, to a speed position and in a direction determined by the direction of rotation of the controlling element 1. The hydraulic gear 63, by means of the drive motor 64, will then drive the controlled element 66 into positional agreement with the controlling element 1 and, at the same time, gearing 65 will transmit to mechanical differential 60 the movement which results in restoring the control shaft 62 of the variable speed hydraulic gear 63 to the inoperative, or zero speed position.

If, for some reason, the controlled element 66 is unable to follow rapid movements of the controlling element 1, and the elements become displaced more than a permissible amount, trolley 21 of low speed follow-up head 10 will have been advanced to a point where it no longer makes contact with short segment 27 and will disconnect double trolley 20 of high speed follow-up head 9 from the circuit, so that the high speed follow-up head 9 will become inoperative and control will be assumed by low speed follow-up head 10. When angular correspondence between elements 1 and 66 is again approximated, trolley 21 will again move into engagement with segment 27, so as to restore control to high speed follow-up head 9. Thus, with suitable gearing throughout, the controlled element 66 will turn in the direction and through the angle set up by the controlling element 1, and will then stop.

Auxiliary means are provided to ensure exact follow-up and includes the gear 67, meshing with gear 41 and attached to the rotor shaft of self-synchronous transmitter 68. This connection is so proportioned, that for the ideal condition of zero angular lag or lead between the rotors of the self-synchronous transmitters 5 and 68, an angular displacement of the rotor of high speed transmitter 5 will cause the pilot motor 11 to drive the rotor of transmitter 68 through the same angular displacement.

A self-synchronous differential receiver 69 is electrically connected to transmitters 5 and 68, so that any relative angular difference between the rotors of transmitters 5 and 68 will produce a torque and turn the rotor of differential receiver 69. Differential receiver 69 is equipped with a follow-up head 71, which is identical with follow-up head 9 of high speed receiver 7. The follow-up head 71 energizes either of the two field systems 72 or 73 of follow-up motor 70 in the same manner that follow-up head 9 controls pilot motor 11. Therefore, gear 99 will transmit movement which will compensate, at mechanical differential 43, for any lag or lead between the rotors of transmitters 5 and 68.

A pin 78 secured to gear 79 is adapted to cooperate with fixed stop 77 and thereby limit the angular displacement of gear 79 to 180° from the inoperative position of follow-up head 71. In normal operation, the angular rotor displacement of differential receiver 69 will be small, so that restricting the rotation of gear 79 to 180° will not interfere with its operation. This is done to prevent follow-up head 71 from contributing errors to the system in case of power failure. For example, controlling element 1, and thereby the rotor of low speed transmitter 6, is turned through an appreciable angle during the time when power is off, and then the power is restored, the rotor of low speed receiver 8 will turn until it is in position agreement with the rotor of transmitter 6. This will cause pilot motor 11 to drive the rotor 75 of transmitter 68 until both follow-up heads 9 and 10 are again in their inoperative position.

Inasmuch as the rotor of high speed transmitter 5 is stationary, and the rotor 75 of transmitter 68 is being rotated, a torque is produced in differential receiver 69 which will cause its rotor to turn through the same angle as the rotor 75 of transmitter 68, and if pin 78 and stop 77 were not provided, gear 79 of follow-up head 71 would be driven by follow-up motor 70 through the same angle as rotor of differential receiver 69. The movement of gear 79 will be transmitted through mechanical differential 43 and gear 44 to reversing switching mechanism 48, and thereby will affect the controlled element 65, so that when the entire system is again in the inoperative position, the controlled element will be out of positional agreement with the controlling element by an amount depending upon the number of revolutions from the inoperative position made by rotor of transmitter 5 while the power was off and the gear ratios between follow-up head 71 and the controlled element 66. Restricting the rotation of gear 79 to 180° from the inoperative position prevents this occurrence.

In the system as described up to this point, a lag in the output of the variable speed hydraulic gear 63 will exist, which lag will be proportional to the velocity of the system. This lag arises from the fact that the control shaft 62 of the variable speed hydraulic gear must be turned through an angle proportional to the speed in order to obtain the required speed of the output. Due to this velocity lag caused by the displacement necessary to operate the variable speed hydraulic gear 63, means are provided to compensate for this lag. This means includes the differential transmitter 68 whose field coil 74 is connected to the A. C. power service, and whose other coil 76 is connected to the armature 42 of a small A. C. commutator generator 98, which is driven by the pilot motor 11, through shaft 34, filter 37 and shaft 40. When the pilot motor 11 is running, a voltage proportional to its speed will be induced in the armature 42 of generator 98 and this voltage is applied to the coil 76 of transmitter 68 in such a way, due to the electrical connections, that the resultant field of the transmitter 68 is shifted ahead of the rotor, thereby affecting the differential receiver 69 in the same manner as if the rotor 75 of transmitter 68 were lagging the rotor of transmitter 5. By means of the follow-up head 71, this action will cause the follow-up motor 70 to apply a correction to the mechanical differential 43, which will compensate for the velocity lag of the variable speed hydraulic gear 63.

Resistances 83 are electrically connected in Y relation with the windings of the three phase wound rotor 86 of control motor 49 for the purpose of limiting the starting current and increasing the starting torque thereof.

Figure 2 illustrates a modification of the control system of this invention, in which the input of a mechanical differential 88 is driven by the pilot motor shaft 34 and its output actuates the contactor 47 of the reversing switching mechanism 48 through gearing 44, 45 and 46. Differential 88 input is also connected to the output shaft 84 of the variable speed hydraulic gear 63, so that the output tends at all times to actuate the reversing switching mechanism in such a way that the direction of rotation of the control motor 49 will be reversed, and thereby return the control shaft 62 of the hydraulic gear 63 to the inoperative or zero speed position. Therefore, with suitable gearing the controlled element 66 will turn in the direction and through the angle set up by the controlling element 1, and then stop. Other parts of the system of Fig. 2 are identical to the corresponding parts of Fig. 1 and need not be further described.

Figure 3 illustrates a second modification of the system, in which the small alternating current commutator-generator 98, used to compensate for the velocity lag of the variable speed hydraulic gear 63, is located at the station of the controlling element. The armature 42 of this generator 98 is connected to shaft 116, which is driven by the controlling element. In the self-synchronous rotary induction transmitters 90 and 91, located at the controlling element 1, and in the receivers 92 and 93, located at the controlled element 66, a two-phase field system is used instead of the single phase field system energizing transmitters 5 and 6 and receivers 7 and 8, of the arrangement of Figures 1 and 2.

The field windings 94 of transmitters 90 and 91 and of receivers 92 and 93 are electrically connected to the alternating current power service, whereas the other fields, 95, of transmitter 90 and receiver 92 are electrically connected across the armature 42 of the generator 98. A resistor 97 is also connected across the armature 42 of generator 98. The other fields 96 of transmitter 91 and receiver 93 are electrically connected across a portion of resistor 97, so that when armature 42 is rotating and generating a voltage proportional to its speed, the resulting voltage applied to the fields 95 is to the voltage which is applied to the fields 96 as the rate of angular displacement of rotor 100 is to the rate of angular displacement of rotor 101. The electrical connections between armature 42 and fields 95, 96 are such that in operation, the resultant magnetic fields of transmitters 90 and 91 are shifted behind their respective rotors 100 and 101, and the resultant magnetic fields of receivers 92 and 93 are shifted ahead of their respective rotors 102 and 103. This produces a lead in the system which will compensate for the velocity lag of the variable speed hydraulic gear. Other parts of the arrangement of Fig. 3 are as in Fig. 1.

Figure 4 is a modification of the system of Figure 3, in which three-phase field system, self-synchronous rotary induction transmitters 104 and 105 and receivers 106 and 107, are used to operate follow-up heads 9 and 10, in place of the two-phase field system transmitters 90 and 91 and receivers 92 and 93, of Figure 3. The field systems 108, 109, 110 and 111, are electrically connected in such a manner that when the entire control system is in the inoperative condition with the electric power on, the field systems are normally energized so that rotors 114 and 115 of respective receivers 106 and 107 are in positional agreement with the respective rotors 112 and 113 of transmitters 104 and 105. In operation, armature 42 of small alternating current commutator generator 98 is driven by shaft 116, and generates a voltage proportional to its speed, which is applied across resistor 97. The electrical connections between resistor 97 and field systems 108, 109, 110 and 111, are such that the resultant magnetic fields of transmitters 104 and 105 are shifted behind their respective rotors 112 and 113, and the resultant magnetic fields of the receivers 106 and 107 are shifted ahead of their respective rotors 114 and 115, in such a manner that the shift voltage applied to fields 108 and 110, is to shift voltage which is applied to fields 109 and 111, as the rate of angular displacement of rotor 112 is to the rate of angular displacement of rotor 113. This produces a lead in the control system which will compensate for the velocity lag of variable speed hydraulic gear 63.

In transmitter 68 of Figure 1, in transmitters 90 and 91, and receivers 92 and 93 of Figure 3, in transmitters 104 and 105, and receivers 106 and 107 of Figure 4, for the small angle or angles of shift of magnetic fields which are required to compensate for the velocity lag of variable speed hydraulic gear 63, the angle of field axis shift is proportional to the magnitude of the shift voltage. This is shown vectorially in space relationship in Figure 5, where vector A represents the field axis before shift, vectors B and B' the shift voltage applied to respectively lag and lead the main field, vectors C and C' represent the resultant field axis after being shifted, and D and D' the angles of shift.

The several motors used throughout the system may be of direct current or alternating current types, inasmuch as the system is equally adaptable to alternating and direct current service for reproducing the movements of any controlling element such as a handwheel, lever, and the like, or for adjusting a remote controlled element in accordance with impulses developed by photoelectric devices, thermostats, valves, floats, air or fluid flow meters and apparatus, and the like, as will be readily understood. It is also to be understood that, although several preferred embodiments of the control system of the present invention have been illustrated and described herein, the invention is not limited thereby, but is susceptible of changes in form and detail within the scope of the appended claims.

We claim:

1. In a system for controlling a controlled element with a controlling element, the combination of power means for driving said controlled element, a control member controlling the speed and direction of movement of said power means, a reversible control motor, operative connections between said control motor and said member, a reversing switch for controlling said control motor and having two sets of contacts, operative connections between said control motor and one set of said contacts, operative connections between said controlling element and said other set of contacts, a differential interposed in said connections between said controlling element and said other set of contacts, and operative connections between said differential and said controlled element.

2. In a system for controlling a controlled element with a controlling element, the combination of power means for driving said controlled element, a control member controlling the speed and direction of movement of said power means, a reversible control motor, operative connections between said control motor and said member including a follow-up connection from said power means, a reversing switch for controlling said control motor and having two sets of contacts, operative connections between said control motor and one set of said contacts, operative connections between said controlling element and said other set of contacts, and means in one of said connections for compensating for the velocity lag of said power means.

3. In a system for controlling a controlled element with a controlling element, the combination of power means for driving said controlled element, a control member controlling the speed and direction of movement of said power means, a reversible control motor, operative connections between said control motor and said member including a follow-up connection from said power means, a reversing switch for controlling said control motor and having two sets of contacts, operative connections between said control motor and one set of said contacts, operative connections between said controlling element and said other set of contacts, means responsive to the speed of said controlling element for advancing the operation of said reversing switch to compensate for the velocity lag of said power means.

4. In a system for controlling a controlled element with a controlling element, the combination of power means for driving said controlled element, a control member controlling the speed and direction of movement of said power means, a reversible control motor, operative connections between said control motor and said member including a follow-up connection from said power means, a reversing switch for controlling said control motor and having two sets of contacts, operative connections between said control motor and one set of said contacts, operative connections between said controlling element and said other set of contacts, a generator driven by said controlling member for generating a voltage proportional to speed, and means responsive to said voltage for modifying the operation of said control motor to compensate for the velocity lag of said power means.

5. In a system for controlling a controlled element with a controlling element, the combination of power means for driving said controlled element, a control member controlling the speed and direction of movement of said power means, a reversible control motor, operative connections between said control motor and said member including a follow-up connection from said power means, a reversing switch for controlling said control motor and having two sets of contacts, operative connections between said control motor and one set of said contacts, operative connections between said controlling element and said other set of contacts, said last-named connections including a follow-up system, a generator driven thereby for generating a voltage proportional to speed, and means for modifying the operation of said follow-up system with said voltage to compensate for the velocity lag of said power means.

6. In a system for controlling a controlled element with a controlling element, the combination of power means for driving said controlled element, a control member controlling the speed and direction of movement of said power means, a reversible control motor, operative connections between said control motor and said member including a follow-up connection from said power means, a reversing switch for controlling said control motor and having two sets of contacts, operative connections between said control motor and one set of said contacts, operative connections between said controlling element and said other set of contacts, means responsive to a lag in said connections, and mechanism actuated by said last-named means for compensating for said lag.

7. In a system for controlling a controlled element, with a controlling element, the combination of power means for driving said controlled element, a control member controlling the speed and direction of movement of said power means, a reversible control motor, operative connections between said control motor and said member, a reversing switch for controlling said control motor and having two sets of contacts, operative connections between said control motor and one set of said contacts, operative connections between said controlling element and said other set of contacts and including an electrical follow-up system, electrical means responsive to a positional disagreement between said controlling element and the receiving end of said follow-up system, a second motor actuated by said electrical means in accordance with the degree of such disagreement, and means for modifying the movement of said follow-up system with said second motor to compensate for such disagreement.

8. In a system for controlling a controlled element with a controlling element, the combination of power means for driving said controlled element, a control member controlling the speed and direction of movement of said power means, a reversible control motor, operative connections between said control motor and said member, a reversing switch for controlling said control motor and having two sets of contacts, operative connections between said control motor and one set of said contacts, operative connections between said controlling element and said other set of contacts and including an electrical follow-up system having a transmitter actuated by said controlling element, a transmitter driven by said last-named connections, a differential receiver jointly driven by said transmitters and responsive to positional disagreement between them, a switch driven by said differential receiver, a motor energized by said last-named switch, and operative connections between said last-named motor and said follow-up system to compensate for any positional disagreement between said controlling element and said reversing switch.

9. In a system for controlling a controlled element with a controlling element, the combination of power means for driving said controlled element, a control member controlling the speed and direction of movement of said power means, a reversible control motor, operative connections between said control motor and said member, a reversing switch for controlling said control motor and having two sets of contacts, operative connections between said control motor and one set of said contacts, a pilot motor, operative connections between said pilot motor and said other set of contacts, means for controlling said pilot motor in accordance with the movements of said controlling element and including an electrical follow-up system, mechanism responsive to a positional disagreement between said controlling element and said pilot motor, and means for modifying the movement of said follow-up system in accordance with the response of said mechanism to compensate for such disagreement.

10. In a system for controlling a controlled element with a controlling element, the combination of power means for driving said controlled element, a control member controlling the speed and direction of movement of said power means, a reversible control motor, operative connections between said control motor and said member including a follow-up connection from said power means, a reversing switch for controlling said control motor and having two sets of contacts, operative connections between said control motor and one set of said contacts, operative connections between said controlling element and said other set of contacts, means responsive to a lag in said connections, mechanism actuated by said last-named means for compensating for said lag, means responsive to the speed of said controlling member for advancing the operation of said reversing switch to compensate for the velocity lag of said power means.

11. In a system for controlling a controlled element with a controlling element, the combination of power means for driving said controlled element, a control member controlling the speed and direction of movement of said power means, a reversible control motor, operative connections between said control motor and said member including a follow-up connection from said power means, a reversing switch for controlling said control motor and having two sets of contacts, operative connections between said control motor and one set of said contacts, operative connections between said controlling element and said other set of contacts including an electrical transmission system, a generator driven by said controlling element for generating a voltage proportional to speed, and means for modifying the operation of said transmission system with said voltage to compensate for the velocity lag of said power means.

ARTHUR P. DAVIS.
GEORGE AGINS.